Dec. 18, 1962     H. A. BING     3,068,770

PHOTOGRAPHIC APPARATUS

Filed Sept. 8, 1960     8 Sheets-Sheet 1

INVENTOR.
Herbert A. Bing
BY Brown and Mikulka
and
Robert J. Schiller
ATTORNEYS

Dec. 18, 1962  H. A. BING  3,068,770
PHOTOGRAPHIC APPARATUS
Filed Sept. 8, 1960  8 Sheets-Sheet 3

INVENTOR.
Herbert A. Bing
BY Brown and Mikulka
and
Robert J. Schiller
ATTORNEYS

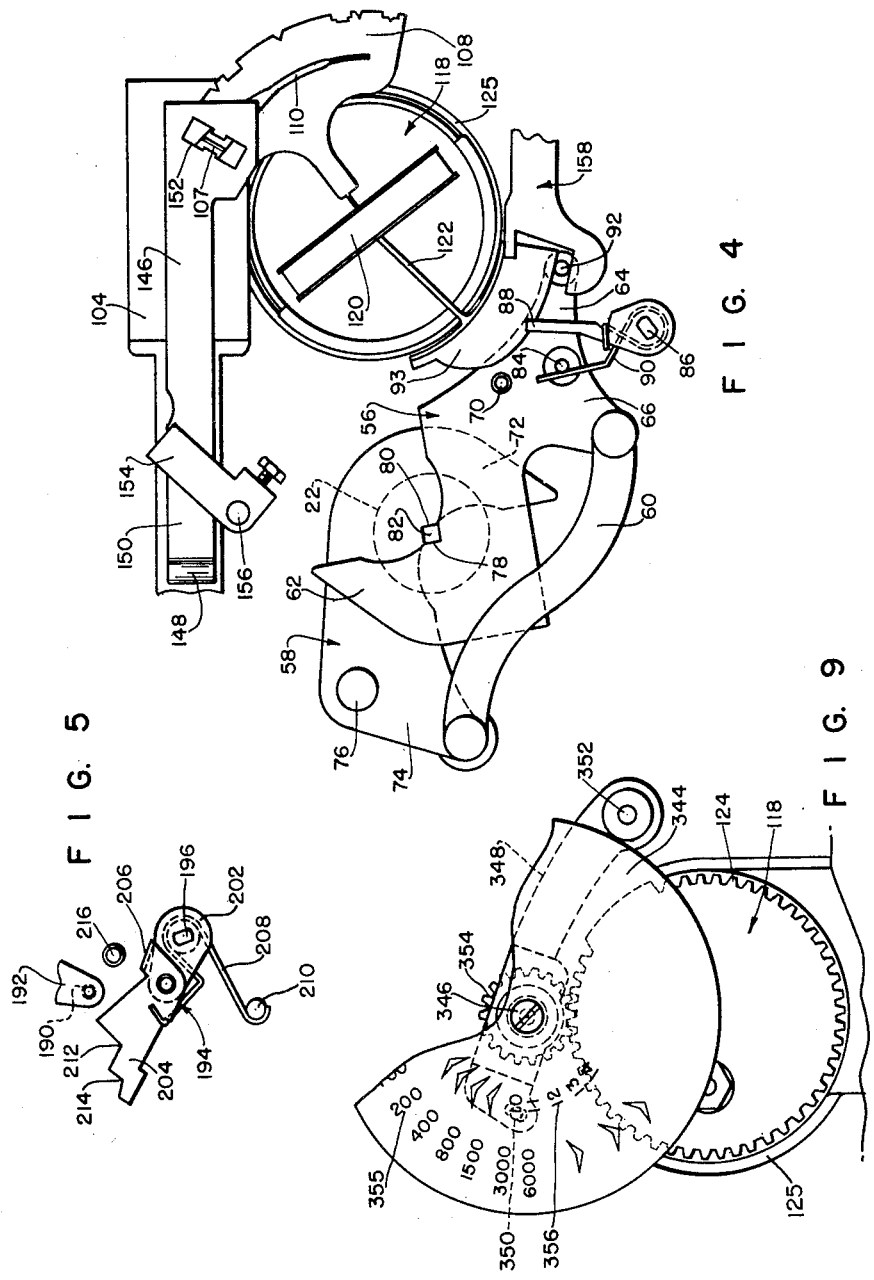

INVENTOR.
Herbert A. Bing
BY Brown and Mikulka
and
Robert J. Schiller
ATTORNEYS

Dec. 18, 1962 H. A. BING 3,068,770
PHOTOGRAPHIC APPARATUS
Filed Sept. 8, 1960 8 Sheets-Sheet 8

INVENTOR.
Herbert A. Bing
BY Brown and Mikulka
Robert J. Schiller
ATTORNEYS

United States Patent Office 3,068,770
Patented Dec. 18, 1962

3,068,770
PHOTOGRAPHIC APPARATUS
Herbert A. Bing, Wellesley, Mass., assignor to Polaroid Corporation, Cambridge, Mass., a corporation
Filed Sept. 8, 1960, Ser. No. 54,666
4 Claims. (Cl. 95—10)

This invention relates to photography and more particularly to photoelectrically responsive exposure devices for use with photographic apparatus.

Photoelectrically responsive exposure devices are known in the art and usually comprise means such as a photocell for producing photocurrent responsively to the intensity of ambient illumination, and means for translating the photocurrent into a mechanical displacement which is employed to control the setting of exposure values of a shutter mechanism, a diaphragm or both. Where the photocell is a photovoltaic cell, continued exposure to light often results in a permanent change in the ratio of evolved photocurrent to light sensitivity, thus necessitating recalibration of the device. If the photocell means comprises a photoconductive cell and accompanying power source, such as a battery, continued exposure to radiation inevitably results in premature exhaustion of the power source.

A principal object of the present invention is to provide, in a photoelectrically responsive exposure control mechanism, a device which prevents undesired exposure of a photocell. Other objects are to provide in a photoelectrically controlled exposure control shutter mechanism, means for exposing the photocell only at predetermined times; and to provide an exposure control mechanism, the exposure parameters of which are determined in response to the photocurrent produced by a photocell, setting means for moving the operating elements to a set position, actuating means for moving the operating elements to effect exposure, and means coupled with the setting means and with the actuating means for rendering the photocell inoperative whenever the elements are not in their set position.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 4 is a diagrammatic view of particular parts of FIG. 1, particularly the diaphragm elements, showing their position during exposure;

FIG. 5 is a diagrammatic view of other parts of FIG. 1, particularly a latching device for retaining the parts of the shutter in set position;

FIG. 9 is a diagrammatic view of particular elements of the shutter of FIG. 6, showing an indicating means cooperating therewith;

The present invention comprehends a novel shutter mechanism which includes a pair of solid shutter blades adapted for covering and uncovering an exposure aperture. In order to effect exposure, one of the shutter elements is positioned in a covering relation to the exposure aperture and is movable to an uncovering position at one side of the aperture. The other of the shutter blades is normally positioned to one side of the aperture and is movable therefrom to a covering position with respect to the aperture for terminating exposure therethrough. The invention also includes movable diaphragm means for defining a variable effective exposure aperture. The operation of the shutter blades and the diaphragm means is coupled through a regulating means which controls the timing of the sequential movement of the shutter blades as well as the setting of the diaphragm means thereby establishing a system of predetermined exposure values.

In the embodiment shown, the exposure provided by the regulating means is a function of ambient illumination. Therefore, the invention comprises means for rendering the intensity of the illumination in terms of mechanical displacements which are employed for predetermining the exposure parameters. The regulating means includes a bellows device, the time rate of distortion of which governs the movement of a cam which, in turn, controls the sequential movement of the blades.

Figure 1:
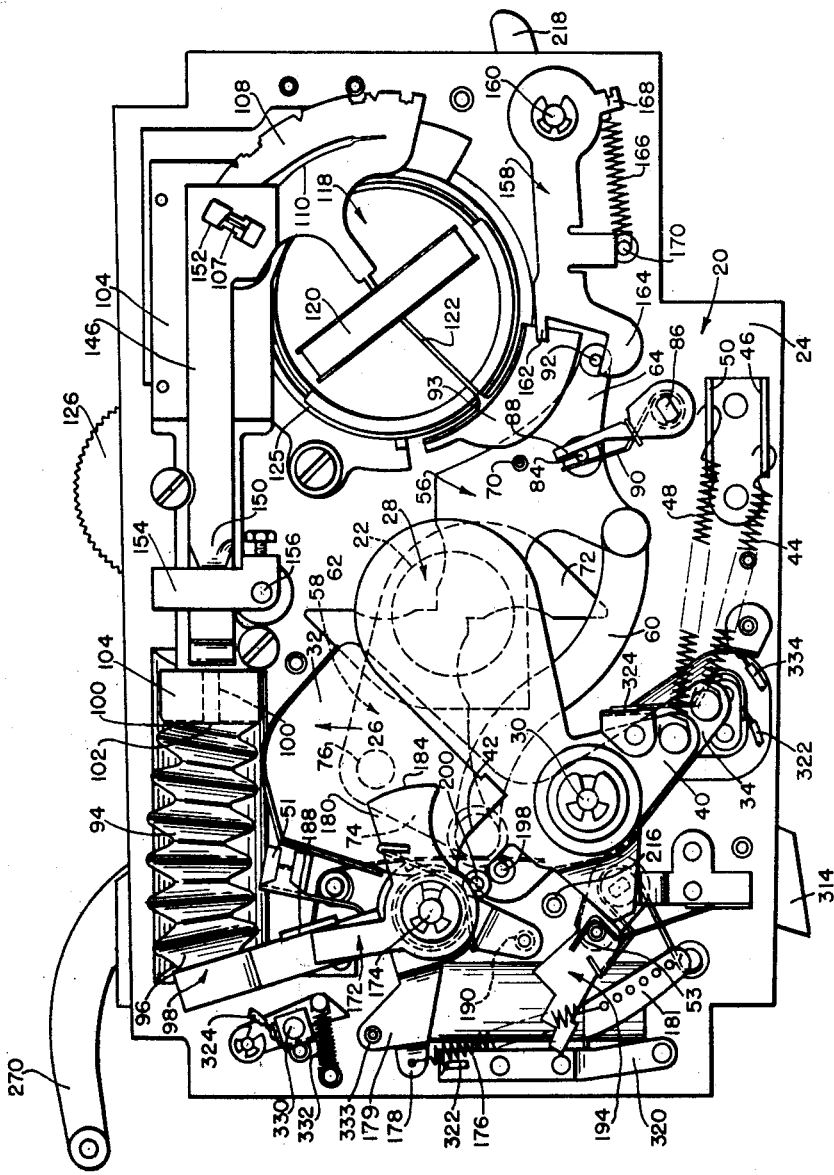
FIGURE 1 is a diagrammatic, rear elevational view of a shutter assembly embodying the present invention, the front housing being removed and the shutter being viewed from the side normally facing the exposure plane of a camera, the various parts of the shutter being shown in rest position.

Referring now to the drawing, there is shown, particularly in FIG. 1, one embodiment of the invention wherein foundation means, such as substantially planar support plate 20, are provided for mounting the operative elements of the invention. Plate 20 includes therein an exposure aperture or opening 22 through which it is intended to selectively pass actinic radiation to effect exposure when the invention is employed in conjunction with a camera including photosensitive material such as a well-known silver halide emulsion film, thermographic plate, photopolymerizable sheet, xerographic plate, or the like. Plate 20 is formed of a material which is substantially opaque to the radiation with which the invention is intended to be employed. Mounting upon one surface 24 of plate 20 adjacent opening 22 are shutter blade 26 and second shutter blade 28.

Figure 6:
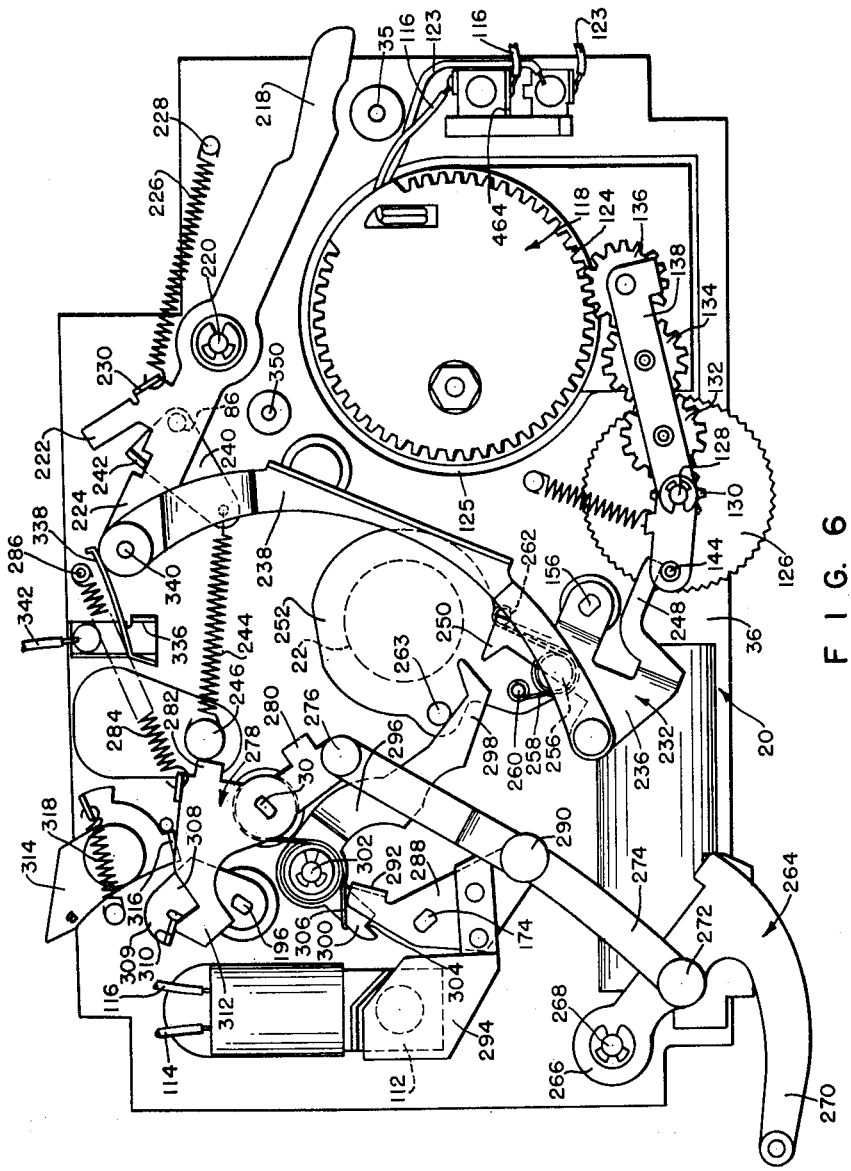
FIG. 6 is a diagrammatic, front elevational view of the shutter assembly of FIG. 1, showing the parts in rest position.

Blade 26 is shaped as a substantially planar elongated member including a radiation opaque, solid covering portion 32 adjacent one extremity thereof, the covering portion being dimensioned for fully covering opening 22 when the plane of the covering portion is aligned substantially perpendicularly to an optical axis through the opening and predeterminedly positioned with respect to opening 22. Blade 26 is pivotally mounted intermediate its extremities upon suitable mounting means such as elongated post 30. When so mounted, the opposite extremity of blade 26, comprising arm 34, extends radially from the post angularly with respect to a radius from the post through approximately the center of covering portion 32. Post 30 is mounted upon and extends through plate 20 to the opposite side or surface 36 of the plate (as shown in FIG. 6), and is freely rotatable about its long axis with respect to the plate. Blade 26 is mounted upon post 30 by known overrunning clutch means so that the rotation of the post in one direction engages and rotates the blade in said one direction, but the post is free to move in the opposite direction without then rotating the blade.

Blade 28 is also an elongated member provided with a similarly dimensioned and formed covering portion 38 adjacent one extremity. The opposite extremity of blade 28 is bifurcated to comprise arms 40 and 42 disposed at an angle to one another. Blade 28 is rotatably mounted upon post 30 intermediate the latter two arms and covering portion 38 so that the arms extend substantially radially from the post. In like manner to blade 26, blade 28 is mounted at one extremity of post 30 by overrunning clutch means as described hereinbefore. The two blades are therefore rotatable in their own planes closely adjacent and substantially parallel to one another.

Figure 2:
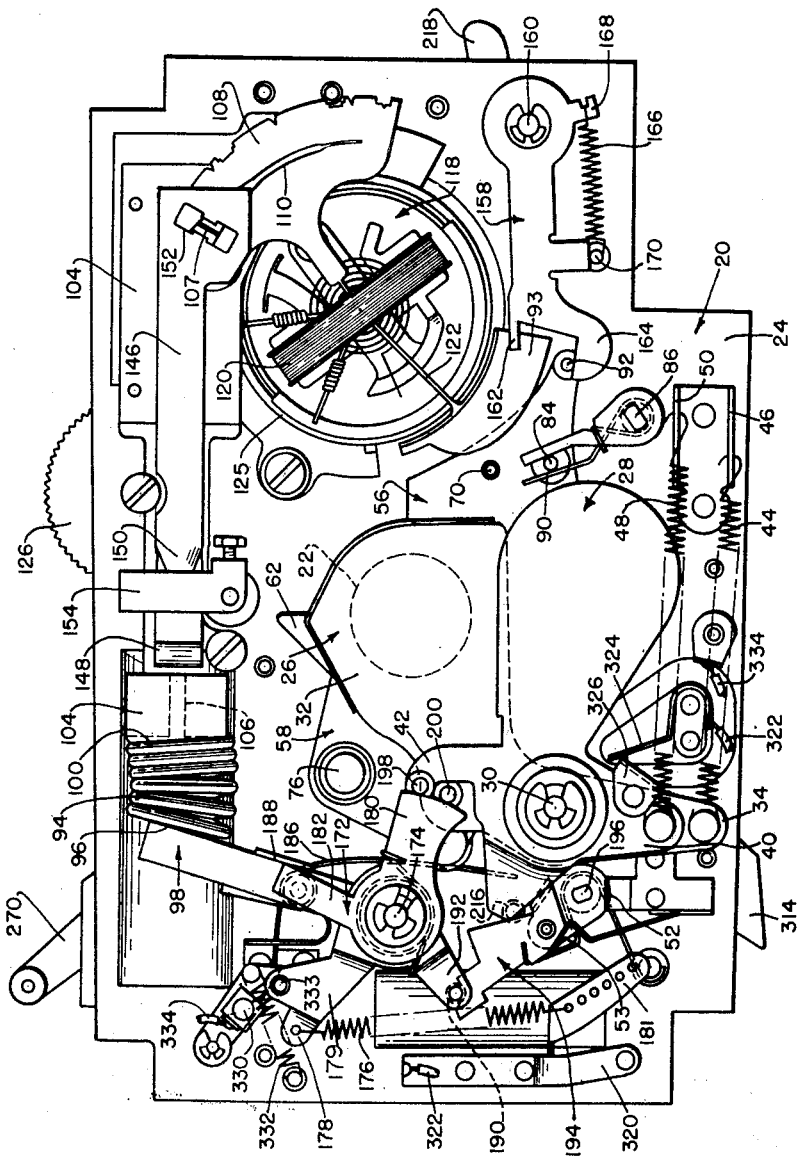
FIG. 2 is a diagrammatic, rear elevational view showing the various parts of the shutter of FIG. 1 in a set position.
Figure 3:
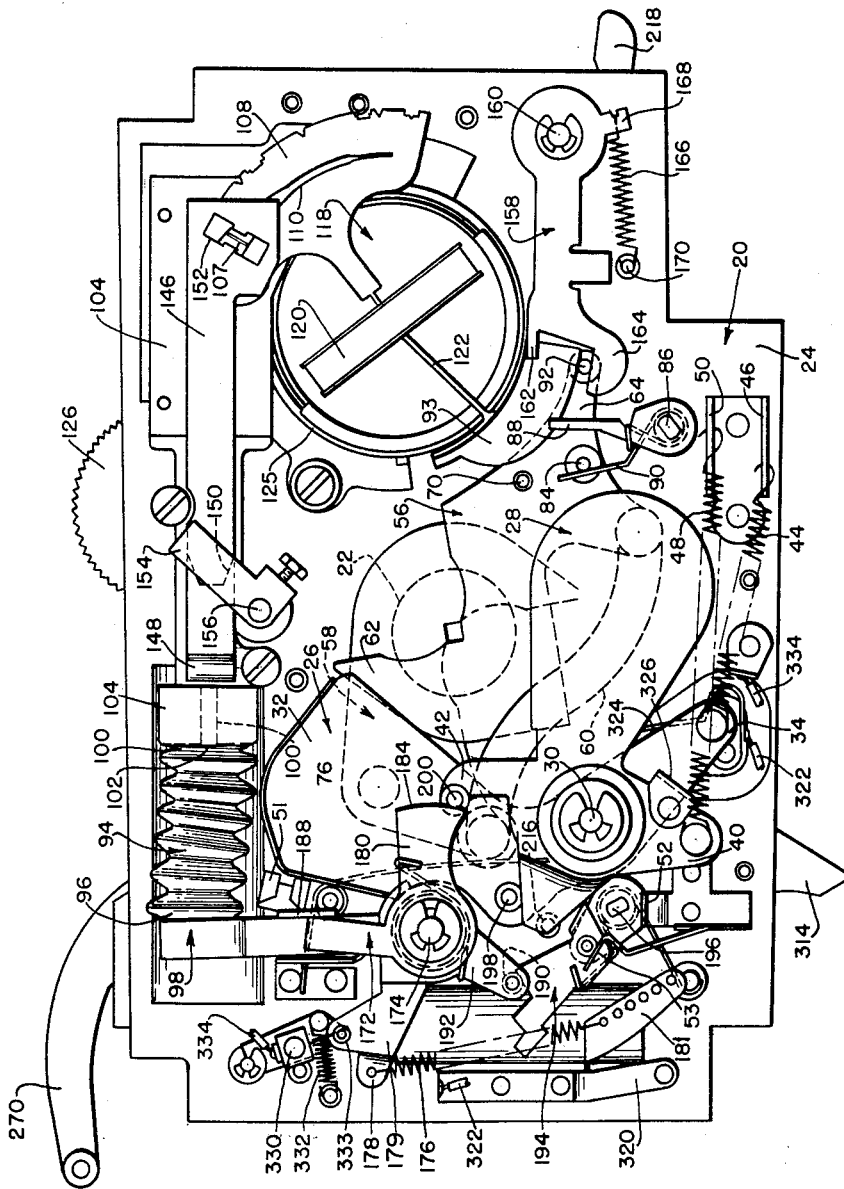
FIG. 3 is a diagrammatic view of the shutter of FIG. 1, showing the postion of parts during "bulb" exposure.

Blade 26 is normally mounted so that covering portion 32 is aligned with opening 22 to completely cover the latter, being therefore in a first or closed position as shown in FIG. 2. The blade is rotatable between the closed position and in uncovering position wherein it is disposed to one side of opening 22 and completely uncovers the latter (as shown in FIGS. 1 and 3). Blade 28 is normally mounted in uncovering position relative to opening 22 at one side thereof (as shown in FIG. 2) and is rotatable between this uncovering position and a second or covering position wherein it is in alignment with and covers opening 22 (as shown in FIG. 1).

As a means for moving blade 26 from closed position to its uncovering position, there is provided a resilient element such as elongated spring 44 which is attached at one of its ends to appropriate mounting means 46 on plate 20, and at its other end at a location adjacent the radial extremity of arm 34. When blade 26 is in its closed position, spring 44 is under stress and provides a bias which tends to rotate blade 26 about the pivotal axis provided by post 30 and into its uncovering position. A similar resilent means, such as elongated spring 48, is provided for moving blade 28. Spring 48 is mounted at its respective ends upon suitable mounting means 50 disposed on plate 20 adjacent mounting means 46 and upon a portion of arm 40. Spring 48 is under stress when blade 28 is in its uncovering position, thereby providing a bias for rotating the blade from its uncovering position to its covering position. Means, such as spring mounted magnet 51 positioned in the path of movement of blade 26 so as to be contactable thereby, is provided as a stop mechanism which defines the limit of motion of the blade after it uncovers aperture 22. Additionally, magnet 51 serves to limit, by magnetic action on a magnetizable portion of the blade, any tendency of the blade to bounce when arrested by the magnet. Similarly, resilient means, such as springs 52 and 53 (which may be formed as a unitary element), are provided for arresting the motion of blade 28 after it has covered aperture 22. Spring 52 is disposed in the path of movement of an extending portion 55 of blade 28 to define one limit of motion of the latter. Spring 53 is located adjacent spring 52 so as to make frictional contact with the blade just before the latter strikes spring 52, thereby slowing the motion of the latter and preventing retrograde blade movement resulting from the impact of the blade with spring 52.

Referring now particularly to FIG. 4 of the drawings, there is shown a diaphragm means which forms part of the invention and is indicated generally by the reference numeral 54. Diaphragm means 54 is preferably of the double-bladed, linkage type and comprises a first or movable master leaf 56 and a second or movable slave leaf 58, the leaves being pivotally connected to one another by means such as elongated link 60. Master leaf 56 comprises an irregularly shaped member which is substantially planar and includes a roughly crescent-shaped portion 62 and a pair of fingers 64 and 66 which extend at an angle to one another and in the plane of the leaf. Leaf 56 is mounted intermediate its arms and crescent-shaped portion upon pivot 70 for rotation about the latter. Slave leaf 58 comprises another irregularly shaped, approximately planar member including a similar crescent-shaped element 72 and an extending finger 74, the leaf being mounted intermediate its crescent-shaped portion and finger for rotation about pivot 76. In the preferred embodiment, the crescent-shaped portions of the two leaves are of approximately the same dimensions, and pivots 70 and 76 are mounted upon plate 20 at substantially opposite sides of opening 22. Link 60 is pivotally connected at its extremities respectively to a portion of finger 66 and to a portion of finger 74.

As a means for defining an effective exposure aperture in cooperation with opening 22, the concave edge of crescent-shaped portion 62 of master leaf 56 is provided with a shape such as notch 78, which in the preferred form is V-shaped to define approximately a right angle; crescent-shaped portion 72 of slave leaf 58 includes a similarly shaped notch 80. Leaves 56 and 58 are disposed to be movable between a closed position wherein the respective crescent-shaped portions overlap to cooperatively cover opening 22 and prevent the passage of actinic radiation therethrough, and a plurality of uncovering positions wherein notches 78 and 80 cooperate to define the outlines of a variable opening 82 which is disposed in symmetrical alignment about an axis perpendicular to the center of the plane of opening 22.

As a means for moving the diaphragm leaves, master leaf 56 includes an engagement element such as pin 84 rigidly mouted on leaf 56 intermediate fingers 64 and 66, and radially displaced from pivot 70. The means for moving the leaves also includes rotatable post 86 mounted upon plate 20 so as to extend therethrough and being freely rotatable with respect to the plate. Post 86 is coupled to the leaves by means such as elongated lever 88, one extremity of which is firmly mounted upon post 86 for rotation therewith and the other extremity of which is normally in releasable engagement with one side of pin 84 so that rotation of the post in one direction moves the leaves, because of the engagement of lever 88 and pin 84, toward their closed position. Post 86 and leaves 56 and 58 are also coupled by resilient means such as hairpin spring 90, one portion of which is mounted upon lever 88 adjacent post 86, and another portion of which is resiliently biased into engagement with the opposite side of pin 84 so that rotation of the post in the opposite direction rotates the leaves toward their uncovering positions. It will therefore be seen that the mechanism thus provided comprises a means for establishing a plurality of effective exposure apertures. Inasmuch as post 86 is coupled to opposite sides of pin 84 by lever 88 and spring 90, as forces exerted on either side of pin 84 cause master leaf 56 to rotate about pivot 70, and as the rotation of leaf 56 is transmitted through link 60 to rotate slave 58, rotation of post 86 will cause the diaphragm leaves to move about their respective pivots in opposite directions to one another thereby expanding or contracting the dimensions of opening 82. As a means for limiting the rotation of master leaf 56, the invention includes a cam follower or pin 92 which is provided as an an upstanding element or pin mounted adjacent the radial extremity of finger 64 and which is adapted to releasably engage a limit stop and cam element 93 both of which will be described hereinafter.

Regulating means are provided for controlling the total exposure provided by the apparatus. The regulating means include setting means for controlling the magnitude or area of the effective exposure aperature provided by the cooperation of notches 78 and 80 with opening 22, and exposure interval control means for determining the exposure time during which the effective exposure aperture remains uncovered.

The exposure interval control means, in the form shown for instance in FIG. 1, comprises a deformable pneumatic element such as substantially elastic, hollow bellows 94. The bellows is preferably shaped as an elongated structure having a first or movable extremity 96 which is connected directly to one end of a rotatable elongated arm 98 and is movable therewith. The bellows also includes a second or fixed extremity 100 having an opening 102 therein through which a fluid or gas may flow in and out of the interior of the bellows. In order to anchor the fixed extremity of the bellows, means are provided which include a passageway from the bellows interior to a fluid-flow controlling means, and in the embodiment shown, this is formed as valve block 104 having tubular passageway 106 therein (only part of which is shown in broken lines), the valve block being mounted by suitable means upon surface 24 of plate 20. One end of passageway 106 connects to opening 102 in the bellows, and is preferably sealed to prevent movement of fluid other than between the passageway and the bellows interior. The other end of passageway 106 terminates at a planar surface of valve block 104 in an opening or valve aperture 107 which, in the form shown, is slit shaped.

For controlling the rate of movement of a fluid or gas in and out of the bellows by way of passageway 106 and valve aperture 107, and thus controlling the time rate of elastic deformation of the bellows, a movable valve element, such as substantially planar valve plate 108, is provided. The valve plate includes therein an arcuate opening 110 which progressively varies in width in a predetermined manner from one extremity of opening 110 to the other. Plate 108 is mounted for rotation substantially in its own plane in a direction substantially perpendicular to the slit shape of valve aperture 107 and parallel to the planar surface of valve block 104. The mounting of valve plate 108 is such that upon rotation of the plate, opening 110 is movable closely adjacent to and across valve aperture 107, thereby cooperating with the valve aperture to vary the effective area of the latter through which a fluid or gaseous medium may pass. Opening 110 is so dimensioned as to permit flow through aperture 107 between a maximum rate determined by the full area of the aperture and a minimum rate established by the limitations upon the effective area of aperture 107 imposed by the narrowest portion of opening 110. Other valve means known in the art may be employed, although the particular construction shown herein is preferred for its simplicity, lightness and ease of operation.

Means are provided so that exposure control can be obtained by manual setting of the regulating means. Additionally, in the form of the invention shown, the regulating means selectively provides exposure control responsively to the electrical signal output of photoelectric means such as photocell 112 shown for instance in FIG. 7, which output is a function of the intensity of light incident upon the photosensitive surface of the cell. It is understood that cell 112 may be photovoltaic, photoconductive or the like, and may include appurtenances, such as batteries, which may be necessary to insure an electrical output. In the embodiment shown, cell 112 is of the photoconductive type and has coupled therewith a pair of leads 114 and 116 which respectively provide electrical connections for the cell with a battery (not shown) and a galvanometer described hereinafter. As a means for translating the electrical signal output of the cell into mechanical displacements, there is provided (as shown in FIG. 1) an electrodynamic device such as a galvanometer 118 having the usual rotatable coil 120, and indicating means, such as needle 122, mounted upon the coil for rotation therewith. Appropriate means, such as electrical conductive leads 123 and 116 (shown only in part in FIG. 7) are provided respectively for connecting the galvanometer to the battery and for feeding the signals from the cell to the galvanometer. The latter is preferably of the well-known type, wherein coil 120 and needle 122 assume an angular equilibrium position in accordance with the intensity of the electrical signals introduced therein. In order to compensate for variables such as different film speeds of photographic film used in cameras which employ the invention, or variations in density of filters which may be placed across opening 22, the invention comprises compensating means and to this end, galvanometer 118 is mounted upon support means such as galvanometer housing 125, which is turn is mounted upon plate 20 for rotation with respect thereto.

Figure 7:
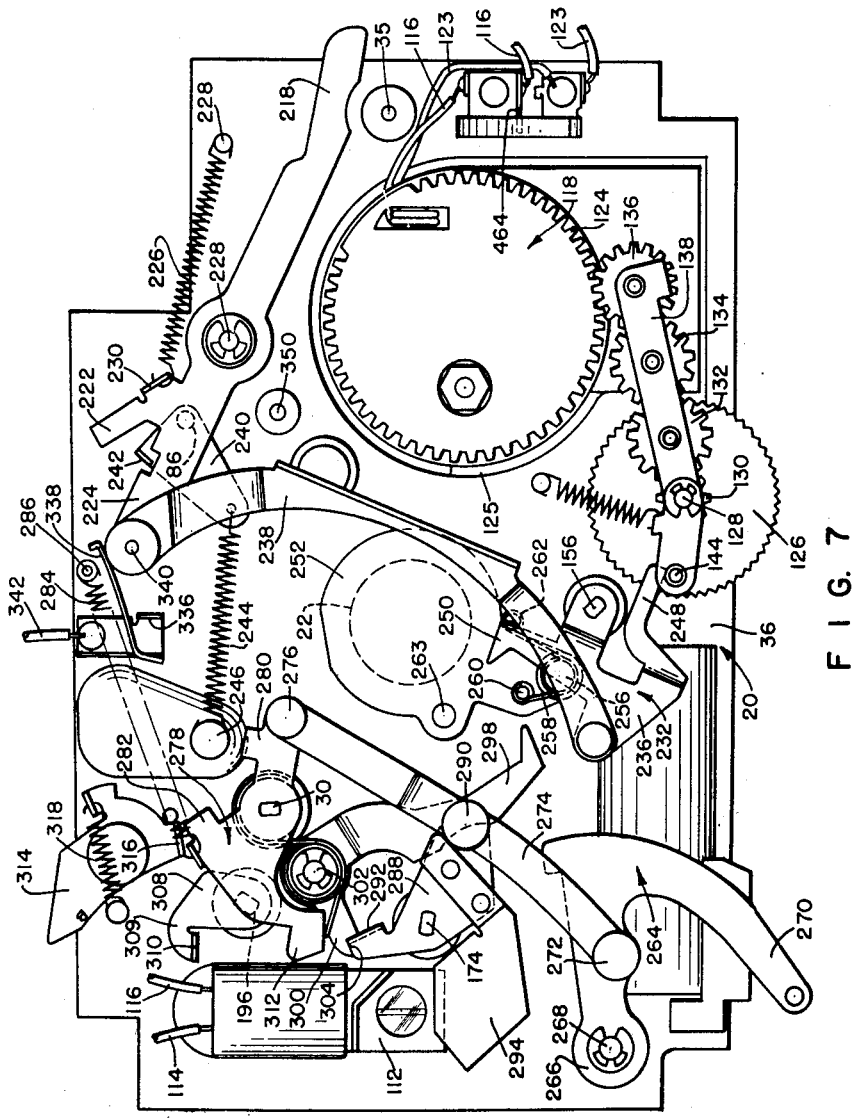
FIG. 7 is a diagrammatic view showing the parts of the shutter of FIG. 6 in set position.
Figure 8:
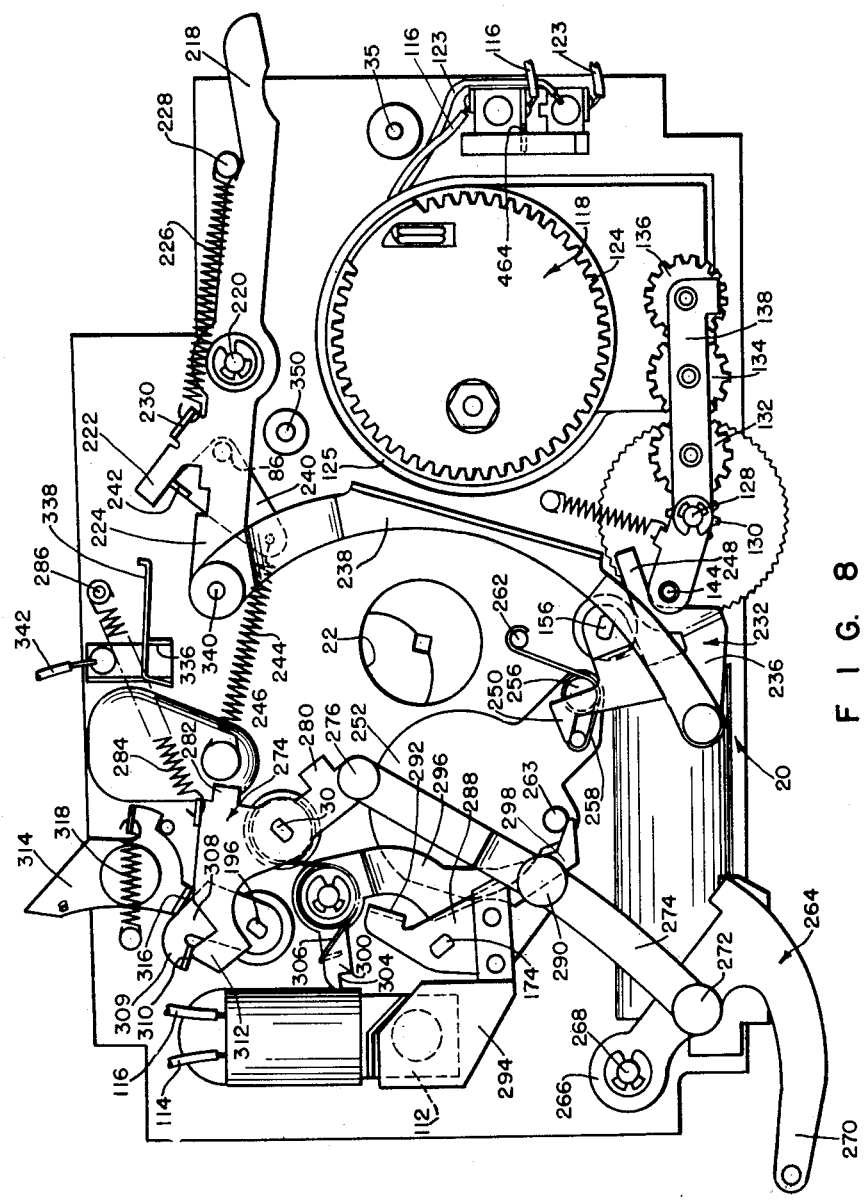
FIG. 8 is a diagrammatic view showing the position of parts of the shutter of FIG. 6 during "bulb" exposure.

The compensating means includes apparatus for rotating the entire galvanometer as a unit, which apparatus is shown particularly in FIGS. 6, 7 and 8 and includes flat circular gear 124 mounted coaxially upon galvanometer housing 125 so that the latter is movable therewith, gear 124 being positioned above surface 36 of plate 20 and lying approximately in a plane parallel to the plane of the backing plate. As a means for rotating gear 124 there is provided manually engageable element 126 which is mounted for rotation about pivot 128 upon the backing plate so that a portion of element 126 extends outwardly of a margin of the plate and is therefore available for manual contact. Element 126 includes circular gear 130 which is affixed to element 126 for rotation coaxially therewith. Means such as a gear train which, in the form shown, includes gears 132, 134 and 136, is provided for transmitting rotation of element 126 to gear 124 so that rotation of element 126 serves to rotate the entire galvanometer with respect to plate 20. As a means for mounting the gear train there is provided an elongated lever 138 which itself is pivotally mounted intermediate its ends and coaxially with element 126 and gear 130. The gears which comprise the gear train are preferably mounted intermediate one end of lever 138 and its pivotal mounting at pivot 128 such that the gear train is always in mesh with gear 130. Means, including spring 140, are provided for rendering the means for rotating gear 124 inoperative as by biasing lever 138 for rotation out of a position in which gear 136 of the gear train is in meshing engagement with gear 124. Spring 140 is mounted adjacent one of its ends upon plate 20 and at its other end to suitable anchor means 142 provided on lever 138 between its pivotal center and its other extremity. Means, including an engagement element or pin 144 mounted adjacent the other extremity of lever 138 described in more detail hereinafter, are provided for releasably retaining lever 138, against the bias of spring 140, in an angular position wherein the gear train is in meshing engagement with gear 124.

Needle 122 and coil 120 of the galvanometer comprise means for moving cam element 93, the latter being mounted upon needle 122 for movement therewith. The extent of rotation of diaphragm leaf 56 is determined by the allowable magnitude of motion of attached pin 92. It will be seen that the shape of the surface of cam element 93, into engagement with which pin 92 is movable, and the position of cam element 93 as determined by the galvanometer, both control the position of the diaphragm leaves and thus the aperture-defining relation of notches 78 and 80 with opening 22; this relation determined responsively to the position and configuration of cam element 93 is a function of the ambient illumination represented by the angular position of the galvanometer coil and needle. The aperture control thus attained through shaping of cam element 93 provides a predetermined relationship, preferably log-linear, between the area of opening 82 and the intensity of ambient illumination affecting the photocell. And, because the position of valve plate 108 is determined by the angular position of the galvanometer coil also, it will be appreciated that the rate of elastic deformation of the bellows is also a function of the ambient illumination and bears a predetermined and fixed relation to the effective exposure aperture.

Inasmuch as coil 120 and associated needle 122 are preferably mounted upon delicate precision bearings and are, therefore, sensitive to vibration or other physical forces external to the invention which would disturb the equilibrium position of the galvanometer elements, it is desirable to provide means for releasably retaining the galvanometer needle in a stationary position at least during exposure operation of the invention. Additionally, as cam element 93 is adapted to be engaged by pin 92 for establishing an effective exposure aperture in accordance with the equilibrium position of the galvanometer coil, it is also preferred that means be provided for releasably retaining the needle in a stationary position, at least during the engagement of cam element and pin.

As shown, particularly in FIGS. 1 through 4 inclusive, means for releasably retaining the needle in substantially stationary position includes a substantially flat, resilient, elongated clamping member 146. One extremity of member 146 is fixedly mounted, for instance, upon valve block 104 as at 148. The member extends from its mounting with the opposite extremity thereof, which is freely movable, normally positioned closely adjacent to and approximately parallel with the plane of movement of valve plate 108 so that the valve plate is ordinarily readily movable between member 146 and block 104. Clamping member 146 includes thereon a raised or cam portion 150 intermediate its extremities and which extends upwardly in a direction away from block 104. The clamping member also includes, adjacent its movable extremity, opening 152, and is so positioned and dimensioned that opening 152 is in alignment with both valve aperture 107 and a portion of arcuate opening 110 in the valve plate. Means, such as locking lever 154, are provided for moving clamping member 146 in and out of engagement with valve plate 108, locking lever 154 being mounted upon post 156 for rotation therewith. Locking lever 154 is rotatable in (as shown in FIG. 4) and out (as shown, for instance, in FIG. 1) of sliding engagement with cam portion 150 such that upon engagement of the locking lever with the cam portion, clamping member 146 is resiliently deformed into engagement with the valve plate and releasably locks the latter between the movable extremity of the clamping member and the valve block. Post 156 is mounted on support plate 20 so as to extend therethrough and be freely rotatable with respect to the plate.

As a means for releasably retaining cam element 93 in a position determined by the angular displacement of the galvanometer needle just prior to exposure, there is provided elongated lever 158 which is pivotally mounted adjacent one extremity thereof upon pivot 160 for rotation with respect to plate 20. The unpivoted extremity of lever 158 is shaped to provide a pair of separate engagement portions 162 and 164. Lever 158 is rotatable between a first position wherein engagement portion 162 of the unpivoted extremity is brought into engagement with a portion of cam element 93, thereby arresting movement of the latter by clamping it against the external periphery of the mounting of galvanometer 118, and a second position wherein engagement portion 162 is out of engagement with cam element 93. Resilient means, such as spring 166, are provided for biasing lever 158 into its first position. In the form shown, spring 166 is connected at one of its ends to an arm 168 forming a portion of lever 158 and extending radially of pivot 160 at an angle to the axis of elongation of lever 158. The other end of spring 166 is mounted upon post 170 which, in turn, is mounted upon surface 24 of plate 20 so as to extend upwardly therefrom and into the path of movement of a portion of lever 158, thereby providing a limit stop which defines the second position of lever 158. Lever 158 is so dimensioned that second engagement portion 164 of the unpivoted extremity of the lever extends into the path of movement of and is adapted to engage pin 92 on diaphragm leaf 56. It will be seen that the arrangement of parts provides that the engagement of locking lever 154 with cam portion 150 for arresting motion of valve plate 108, and the clamping of cam element 93 for arresting the motion of the latter, result at substantially the same time, thereby obviating any undue strain upon the mounting of the galvanometer needle and coil which might occur in the event the valve plate and cam element 93 were arrested at different times.

The exposure interval control means also includes timing means such as element 172 which is mounted, as shown particularly in FIGS. 1, 2 and 3, coaxially with rotatable arm 98, for rotation about suitable mounting means such as post 174, the latter being disposed on plate 20 so as to extend therethrough and be freely rotatable about its long axis relative to the plate. Rotatable arm 98 and element 172 are connected with post 174 for rotation both with and independently of one another. The mounting of arm 98 and element 172 upon post 174 is by known overrunning clutch means (not shown) such that rotation of post 174 in a clockwise direction, as viewed for instance in FIG. 6, moves both arm 98 and element 172 in a clockwise direction, yet post 174 is free to move in a counterclockwise direction without accompanying rotation of the arm and element. The unpivoted extremity of arm 98 is directly affixed to movable extremity 96 of the bellows. As a means for rotating arm 98 in a counterclockwise direction against retarding effect of the bellows, there is provided a resilient element, such as elongated spring 176, one end of which is anchored to offset finger 178 forming a portion of arm 179 which extends substantially radially of post 174 and at a predetermined angle with respect to a radius joining post 174 with movable extremity 96 of the bellows. The other end of spring 176 is connected to anchoring device 181 so that spring 176 biases rotatable arm 98 against, in the form shown, the retarding effect of bellows deformation in expansion.

Timing element 172 is shaped to include a pair of limbs 180 and 182 which extend at an angle with respect to one another, the element being mounted upon post 174 at approximately the juncture of the limbs. At its radial extremity, one limb 180 is provided with an extending cam surface 184. In the embodiment shown in the drawing, surface 184 is shaped in a simple curve of predeterminedly limited angular magnitude and having a constant radius of curvature, the center of curvature being the post 174. Timing element 172 is biased for rotation about post 174 by resilient means, such as hair spring 186, in a direction opposite to the rotational bias exerted on rotatable arm 98 by spring 176. Arm 98 is provided intermediate its extremities with an upstanding portion 188 which extends into the path of rotation of a portion of limb 182, the latter being biased by spring 186 into engagement with upstanding portion 188.

Rotatable arm 98 is pivotable under the bias of spring 176 from a first position wherein the spring is stressed to provide maximum tension and bellows 94 is in a collapsed position in which its interior space is at a predetermined minimum, to a second position wherein the bellows has expanded to its fullest extent and permits of no further rotation of arm 98. Because of the location of upstanding portion 188 and its engagement with limb 182, it will be seen that rotation of arm 98 from its first to its second positions is positively accompanied by rotation of timing element 172 in the same direction. Consequently, the speed of movement of the timing element in this direction is largely governed by the speed of movement of the arm from its first to its second position, and the speed of movement of the latter is variable in accordance with the flow of fluid into the bellows as determined by the position of valve plate 108.

As a means for releasably retaining the rotatable arm in its first position, it is provided with an engageable portion or pin 190 which is mounted upon an extending portion 192 of arm 98 upon an opposite side of post 174. The means for releasably retaining arm 98 in its first position also include latching device 194 mounted upon pivot 196 for rotation therewith and in and out of engagement with pin 190. Pivot 196, in turn, is mounted upon plate 20 and extends therethrough, being freely rotatable with respect to the plate.

Second arm 42 of shutter blade 28 is provided adjacent its radial extremity with a cam follower or stud 198 which extends substantially perpendicularly to the plane of the blade. Stud 198 is so located on arm 42 that under predetermined conditions (when rotatable arm 98 is in its first position, timing element 172 is in its normal position wherein spring 186 has forced limb 182 into engagement with upstanding portion 188, and shutter blade 28 is in its fully uncovering position), stud 198 is in slidable engagement with surface 184 of the timing element. It will therefore be seen that stud 198 and cam surface 184 constitute means for releasably retaining shutter blade 28 in its uncovering position.

Similarly, shutter blade 26 is provided intermediate post 30 and covering portion 32 with a cam follower or stud 200 which extends substantially perpendicularly to the plane of the blade. Stud 200 is so located on the blade that under certain conditions (when the timing element is in its normal position, rotatable arm 98 is in its first position, and blade 26 is in its closed position), stud 200 is also in slidable engagement with surface 184. The latter surface and stud 200 therefore constitute means for releasably retaining shutter blade 26 in its closed position.

When studs 198 and 200 are in engagement respectively with surface 184, corresponding springs 48 and 44 are stressed to exert predetermined maximum biases for rotating the blades. Stud 200 and surface 184 are dimensioned so as to provide for disengagement thereof following a predetermined angular rotation of the timing element as the latter accompanies arm 98 in its movement from its first position. Following the disengagement of the cam surface and stud 200, it will be seen that blade 26 is free to rotate rapidly from its closed to its uncovering position under the resilient bias imposed thereon. Similarly, stud 198 and cam surface 184 are so dimensioned that after an additional predetermined angular rotation of timing element 172, stud 198 is disengaged from the cam surface to free shutter blade 28 for rotation rapidly to its fully closed position under the bias imposed by spring 48. In the preferred embodiment, the arrangement of studs 198 and 200 and cam surface 184 provide that upon this rotation of the timing element, the studs are released in a sequence whereby first blade 26 is free to move to its uncovering position, and then blade 28 is free to rotate to its closed position.

From the foregoing description and the drawing, it will be apparent that a plurality of forces act upon rotatable arm 98 as it moved from its first position. Because there are at least two opposed spring forces (basically, those provided by spring 176 and the inherently resilient operation of the bellows), it is possible that some oscillation will appear during this movement of arm 98 and impair the time keeping qualities of the shutter mechanism which depend upon a relatively continuous, non-oscillatory movement of the timing element. Consequently, in the preferred embodiment, at least cam surface 184 of element 172 is formed of a plastic material which exhibits a relatively high coefficient of friction relative to the material of which studs 198 and 200 are formed. Additionally, because of the compliant coupling between the timing element of arm 98, it will be seen that oscillations of the bellows which result in clockwise motion of the arm does not necessarily move the timing element in a clockwise direction, for this motion of the arm merely urges the timing element clockwise through the spring connection. The small frictional retardation (which is considerably smaller in magnitude than the forces exerted by spring 176 and bellows 94) thus provided by the natures of the cam surface and studs serves to retard this clockwise motion of the timing element urged by the arm; thus, the frictional effect together with the compliant coupling between the timing element and arm provided by spring 186 (the forces exerted by spring 186 being of an order of magnitude only somewhat greater than the frictional forces) constitute a device which minimizes or damps any undesirable oscillations of rotatable arm 98. Additionally, the spring coupling between the timing element and rotatable element 172 serves another useful purpose described hereinafter in connection with the setting of the various elements of the shutter mechanism.

Latching device 194, shown in detail in FIG. 5, is preferably provided as a compliant mechanism comprising a first elongated element 202 pivotally mounted adjacent one of its ends upon pivot 196 and affixed to the latter for rotation therewith. Mounted upon element 202 adjacent the other end of the element is an irregularly shaped elongated latch member 204 which is rotatable with respect to element 202 in a plane substantially parallel with the plane of rotation of the element. Latch member 204 is mounted adjacent one of its extremities upon element 202 and includes an upstanding portion or flange 206 located near the pivotal mounting of the member and which, by engagement with a side of element 202, prevents rotation of member 204 in a clockwise direction with respect to element 202. Element 202 and member 204 are compliantly linked by resilient means such as hairpin spring 208 which is centrally anchored about pivot 196. Spring 208 has one extremity thereof in engagement with a support pin 210 mounted on plate 20, the other extremity of spring 208 being in engagement with member 204 for biasing the latter so that flange 206 is forced into engagement with element 202. The opposite extremity of member 204 is shaped to present a plurality of serrations or notches 212 and 214 which are radially displaced from one another with respect to the pivotal mounting of the latch member. Notches 212 and 214 constitute means for effecting the engagement of the latching device with pin 190, and spring 208 therefore also constitutes means for rotating device 194 in a direction toward engagement of the latter with pin 190. A limit stop, in the form of pin 216 is provided in the path of rotation of member 204 for establishing through engagement therewith the limit of rotary motion of both element 202 and member 204 in a clockwise direction.

The invention also includes means for actuating the various elements heretofore described. In the form shown in FIGS. 6 through 8, the actuating means comprises a linkage system disposed on the opposite surface 36 of plate 20 from the shutter and diaphragm means. The linkage system includes an element such as elongated actuating lever 218 which is mounted intermediate its extremities upon the backing plate for rotation with respect thereto about suitable bearing means 220. The actuating lever is so mounted that one extremity thereof extends beyond the periphery of the backing plate for manual engagement by an operator of the mechanism, whereby the actuating lever may be rotated. The opposite extremity of the actuating lever is bifurcated to form a pair of extending fingers 222 and 224 disposed at an angle with respect to one another. Means, such as spring 226, are provided for biasing the actuating lever for rotation in a clockwise direction into its rest position, spring 226 being mounted at one extremity upon boss 228 extending from surface 36 of plate 20, and at its other extremity upon upstanding portion 230 of finger 222.

The linkage system also includes an element such as crank 232 having a pair of oppositely extending arms 234 and 236. Crank 232 is mounted by arm 234 upon a portion of post 156 which extends through plate 20 outwardly of surface 36, the post and crank being fixed for rotation with one another. The linkage system also includes an elongated arcuate member such as link 238. One end of link 238 is pivotally mounted adjacent an extremity of arm 236, the other end of the link being pivotally mounted adjacent the extremity of and upon finger 224 thereby coupling link 232 with actuating lever 218 so that rotation of the latter is accompanied by rotation of post 156.

The linkage system also includes short elongated lever 240 having one extremity thereof firmly connected to post 86 for rotation with the latter. Lever 240 also includes an upstanding portion of tab 242. Actuating lever 218 and lever 240 are respectively so dimensioned and located that tab 242 extends upwardly from lever 240 and into the path of rotation of lever 218 between fingers 222 and 224. Resilient means, such as spring 244, are provided for biasing lever 240 in a clockwise direction, the spring having its ends respectively mounted upon the opposite extremity of lever 240 and upon appropriate mounting means, such as boss 246, located on surface 36 of the plate. It will be seen that the bias thus imposed upon lever 240 also biases post 86 so as to force lever 88 firmly into engagement with pin 84.

Upon counterclockwise rotation (as viewed, for instance, in FIG. 7) of actuating lever 218 by an operator, the linkage system is movable from its rest position, against the bias of spring 226 toward a second or displaced position. When the linkage system is in its rest position, as previously stated, lever 88 is forced against pin 84 and, therefore, pin 92 is out of engagement with cam element 93. Additionally, when the linkage system is in rest position, locking lever 154, which is coupled with crank 232 through post 156, is out of engagement with cam portion 150.

Crank 232 also includes another pair of arms 248 and 250 so disposed as to extend substantially oppositely to one another at opposite sides of post 156. When the linkage system is in its rest position, arm 248 is so dimensioned and disposed as to extend into the path of movement of pin 144 on lever 138 and is in engagement therewith, thereby providing means for releasably retaining lever 138 in an angular position wherein gear 136 is in meshing engagement with gear 124.

The invention includes a cover blind or cap 252 which is shaped as a substantially flat, elongated element having, at one end thereof, a covering portion 254 adapted to completely cover aperture 22 when in a first position. Cap 252 is so pivotally mounted adjacent its other end upon pivot means 256 located on surface 36 of the backing plate, that the cap is rotatable, in its own plane substantially parallel and closely adjacent to the plane of surface 36 to a second position at one side of aperture 22, thereby completely uncovering the latter. Resilient means, such as spring 258, are provided for biasing the cap into its first position, spring 258 being formed as a hairpin spring wound about pivot means 256 and having a pair of ends respectively mounted upon pins 260 and 262. In turn, pin 260 is firmly mounted upon cap 252 so as to extend into the path of movement of arm 250 for releasable engagement with the latter following a predetermined rotation of crank 232 from the rest position of the linkage system. Pin 262 is firmly mounted upon surface 36 of the backing plate and extends into the path of movement of the cap so that the latter is normally biased into engagement therewith by spring 258. It will therefore be seen that pin 262 constitutes limit stop means for defining the first position of the cap. Cap 252 also includes second pin 263 firmly mounted thereon and extending substantially perpendicularly to the plane of rotation of the cap from a location intermediate covering portion 254 and pivot means 256.

Cocking means are provided for setting portions of the mechanism and for stressing the various springs. In the form shown, for instance, in FIG. 7, the cocking means comprises cocking lever 264 which is shaped as an arcuate, elongated element having one extremity 266 pivotally mounted upon surface 36 of plate 20 by suitable pivot means or post 268, and being so disposed that the other extremity 270 of the cocking lever extends outwardly beyond the periphery of plate 20 for ready manual engagement by an operator of the device. Post 268 extends through plate 20 to the opposite surface thereof and is free to rotate with respect to the plate. Pivotally mounted by suitable means 272 upon an intermediate portion of cocking lever 264, and movable therewith, is one extremity of an elongated element such as connecting link 274, the other extremity of connecting links 274 is pivotally coupled, as by pin 276, to one end of an elongated element or trip lever 278. The latter is mounted intermediate its ends upon a portion of post 30 which extends outwardly of plate 20 at surface 36 and is firmly connected thereto for rotation therewith. Trip lever 278 includes thereon a pair of engagement portions 280 and 282, the former being located to one side of the pivotal mounting of the trip lever and adjacent pin 276, the latter being mounted intermediate post 30 and the opposite extremity of the trip lever. Both engagement portions are so spaced with respect to post 30 that, upon a predetermined rotation of the trip lever in a counterclockwise direction, engagement portion 280 contacts boss 246 to arrest rotation, and upon predetermined rotation of the trip lever in a clockwise direction engagement portion 282 contacts boss 246 thereby arresting rotation of the trip lever in this direction.

The mechanism provided by cocking lever 264, link 274, and trip lever 278 comprises hoisting means whereby rotation (in a counterclockwise direction as viewed, for instance, in FIG. 7) of lever 264 by an operator rotates post 30 in a direction which allows the overrunning clutch means of post 30 to pick up both blades 26 and 28 and thereby raise both the former from its uncovering to its closed position and the latter from its covering to its uncovering position relative to opening 22. Cocking lever 264 is rotatable between a rest and a displaced position, the rest position being defined by the arrest of movement of the hoisting means consequent upon contact of engagement portion 282 with boss 246. Cocking lever 264 is biased into this rest position by resilient means, such as elongated spring 284, mounted upon trip lever 278 and acting upon the cocking lever through connecting link 274. One end of spring 284 is preferably connected to the trip lever at a location adjacent engagement portion 282, the other end of the spring being mounted upon anchor pin 286 extending outwardly from surface 36 of plate 20. The displaced position of cocking lever 264 is therefore defined by the position at which the rotation of the trip lever, against the bias of spring 284, is arrested by the engagement of portion 280 with boss 246.

The cocking means also includes means for moving rotatable arm 98 and, therefore, timing element 172 from the second to the first position of the former. This last-named means comprises an elongated member 288 fixedly mounted intermediate its extremities upon post 174 for rotation therewith. One extremity of member 288 is pivotally connected, as by pivot 290, to an intermediate portion of link 274. The other extremity of member 288 includes an engagement portion or downturned tab 292 thereon. Mounted firmly upon member 288 for rotation therewith are means, such as substantially planar blade 294, for covering and uncovering the photosensitive portion of the photocell in a predetermined manner. Blade 294 is formed of material which is substantially opaque to radiation intended to be employed for exciting the photocell. Of course, the blade is so dimensioned and photocell 112 and pivot 174 are so located that rotation of member 288 moves the blades in and out of covering relation to the photosensitive portion of the photocell.

Latch means are provided for releasably locking the entire cocking means into set position wherein cocking lever 274 is in its displaced position, blades 26 and 28 have been raised respectively to their covering position of the former and the uncovering position of the latter, and rotatable arm 98 and timing element 172 are in their first position. This latch means comprises bell crank 296 which includes a pair of extending arms 298 and 300.

Bell crank 296 is mounted at the juncture of arms 298 and 300 upon pivot 302 for rotation with respect to surface 36 of plate 20. Pivot 302 is so located and bell crank 296 is so dimensioned that the unpivoted extremity of arm 298 extends into the path of rotation of pin 263 and is engageable therewith, and notched portion 304 adjacent the unpivoted extremity of arm 300 extends into and is releasably engageable with tab 292 of member 288. Means, such as hairpin spring 306, are provided for biasing bell crank 296 for rotation in a direction toward a position wherein notch portion 304 engages tab 292 and another position wherein arm 298 engages pin 263.

The invention includes means for releasing latching device 194 from engagement with pin 190, and this means is provided as short elongated lever 308. One end of lever 308 is mounted upon pivot 196 for rotation therewith, the other end 309 of lever 308 being shaped to present an upstanding portion 310 which extends into the path of rotation of and is engageable with engagement portion 312 of trip lever 278, engagement portion 312 being located adjacent the extremity of the trip lever which extends approximately radially of post 30 in a direction opposite to the extremity of the trip lever upon which pin 276 is mounted.

The parts of the invention thus far described operate in the following manner, assuming the parts to be cocked:

Electrical signals are produced by photocell 112 responsively to the intensity of the radiation intended to be passed through exposure aperture 22 to effect an exposure. The signals are transmitted through leads 116, 114 and 123 to galvanometer 118, and in response to the signals, coil 120 assumes a position of equilibrium, needle 122 being moved correspondingly with the coil. The movement of needle 122 rotates valve plate 108 so that opening 110 is pivoted across valve aperture 106, thereby providing an effective area for the passage of a fluid or gas through the valve aperture. The size of the effective area thus provided will be seen to be a function of the magnitude of radiation which stimulates the photocell. Cam element 93 likewise moves with needle 122 to a position corresponding to the equilibrium position of the galvanometer coil.

In order to actuate the mechanism, the operator grasps an extremity of actuating lever 218 and, by exerting pressure thereagainst, rotates the actuatitng lever in a counterclockwise direction, as shown in FIG. 6, about bearing means 220. As lever 218 is so rotated, finger 222 engages tab 242 thereby rotating lever 240 against the bias of spring 244. Because of the linkage system, the rotation of lever 240 is accompanied by the rotation of crank 232. Thus, the initial rotation of the actuating lever, by rotating lever 240 and crank 232, causes posts 86 and 156 to rotate also. The rotation of the latter, in turn, rotates lever 88 and locking lever 154 so that the latter is brought into engagement with cam portion 150; the rotation of post 86 forces spring 90 against pin 84 impelling pin 92 against cam element 93. Inasmuch as pin 92 is normally in engagement with second engagement portion 164 of lever 158 and thereby releasably retains lever 158 in its second position, the rotation of leaf 156 under the force exerted upon pin 84 by spring 90, releases lever 158 for movement of the latter under the bias of spring 166 so that engagement portion 162 engages a portion of cam element 93 to lock the latter against a peripheral portion of the galvanometer housing. In the preferred embodiment the arrangement of parts is such that upon a predetermined rotation of actuating lever 218, the camming effect of locking lever 154 (which locks valve palte 108) and the locking effect of lever 158 (which clamps cam element 93) are obtained in a substantially simultaneous manner. As a consequence of the aforementioned camming and locking effects, it will be seen that needle 122 and coil 120 are releasably retained in a substantially stationary position which is determined by the signals received by the galvanometer approximately at the time of the initial rotation of lever 218 by the operator.

As the locking of the galvanometer coil occurs, the rotation of crank 232 moves arm 248 away from the position at which the latter acts to releasably retain lever 138, through engagement with pin 144, in its position wherein gear 136 is in engagement with gear 118. This allows lever 138 to so rotate under the impetus provided by spring 140 as to disconnect the gear train from the galvanometer housing, thus providing means for preventing inadvertent rotation of the galvanometer housing during operation of the invention. It will be apparent that rotation of the galvanometer housing, while the coil is clamped, would severely damage the delicate bearings of the galvanometer.

Diaphragm leaves 56 and 58, being coupled through link 60 for rotation in opposite directions, are impelled to move from their closed position with respect to opening 22 by the force exerted on pin 84 by spring 90. This movement of the leaves is arrested by the engagement of pin 92 with clamped cam element 93 at a position determined by the configuration and location of cam element 93. Thus the magnitude of the effective exposure aperture defined by the cooperation of opening 22 with notches 78 and 80 is a function of the position and shape of cam element 93, and the effective exposure aperture 93 is automatically predetermined in accordance with the intensity of illumination incident on photocell 112.

Assuming that the shutter is in set position (blade 26 is in its closed position, blade 28 is in its uncovering position, bellows 94 is collapsed, cam surface 184 of timing element 172 is in engagement with studs 198 and 200, notch 214 is in engagement with pin 190, and the cocking means is latched so that lever 270 is in displaced position), "instantaneous" exposure by the invention is effected in the following manner. Following clamping of the galvanometer, disconnection of the gear train and setting of the effective exposure aperture, continued rotation of actuating lever 218 moves arm 250 into engagement with pin 260 thereby pivoting cap 252 toward its uncovering position. Approximately as cap 252 arrives at its uncovering position, pin 263 engages arm 298 causing bell crank 296 to rotate against the bias of spring 306 in a clockwise direction. This releases tab 292 from its engagement with notch portion 304 of arm 300 thereby allowing movement of the cocking means under the impetus provided by spring 284. Rotation of trip lever 278 is therefore transmitted through link 274 to cocking lever 264, rotating the latter toward its rest position. The rotation of trip lever 278 is also transmitted through link 274 to member 288 which pivots to move blade 294 to its covering position with respect to photocell 112, thereby rendering the latter inoperative. As the rotation of trip lever 278 continues, engagement portion 312 thereon contacts upstanding portion 310 of lever 308 causing post 196 to rotate in a clockwise direction as viewed, for instance, in FIG. 6. The movement of the various elements of the cocking means continues until they have arrived at rest position wherein engagement portion 282 of the trip lever is in contact with boss 246 and, therefore, the trip lever can progress no further in a clockwise direction.

The rotation of post 196 in a clockwise direction, as viewed in FIG. 6, and therefore in a counterclockwise direction, as viewed in FIG. 1, turns latching device 194 rapidly in the latter direction, breaking the engagement of notch 214 with pin 190, thereby unlatching rotatable arm 98. This frees arm 98 and timing element 172 for rotation from the first position to the second position under the bias imposed by spring 176. The rotation of arm 98 and timing element 172 tends to expand bellows 94 from its collapsed position thereby causing an attenuation of the working fluid in the bellows and creating a retarding force acting against the rotating bias of spring 176. The retarding force exerted by the bellows is established by the rate of flow of the working fluid into the bellows, which rate is a function of the effective aperture provided by the combination of opening 110 and valve aperture 107 in accordance with equilibrium positon of the galvanometer coil. Consequently, the speed of rotation of arm 98 and timing element 172 is controlled in accordance with the electrical signals produced responsively to light incident upon the photocell at approximately the time that the galvanometer mechanism was clamped. As timing element 172 rotates from its first position, surface 184 moves relative to studs 198 and 200, releasing stud 200 after a predetermined rotation and after an additional rotation, releasing stud 198.

With the release of stud 200, shutter blade 26 rotates rapidly from its closed position (as shown in FIG. 2) toward its open position (as shown in FIG. 3) under the impetus provided by spring 44, thereby initiating exposure through the effective exposure aperture provided by the cooperation of the diaphragm leaves and opening 22. This rotation of blade 26 continues until arrested by engagement thereof with magnet 51.

Upon the release of stud 198, shutter blade 28 is rotated rapidly under the bias of spring 48 from its open position (as shown in FIG. 2) toward its closed position (as shown in FIG. 1), thereby abruptly terminating the exposure. The timing interval of the exposure provided by the movement of the shutter blades is thus determined by the speed of rotation of timing element 172 between the sequential release of the respective studs, and, consequently, is a function of the level of ambient illumination determined by the photocell.

Following rotation of actuating lever 218, in a counterclockwise direction, which effects exposure, release of the actuating lever by the operator permits return of lever 218 in the opposite direction under the bias of spring 226. This then releases the engagement of finger 222 with tab 242 and allows spring 244 to rotate lever 240, thereby restoring the diaphragm leaves to their closed position and permitting lever 158 to rotate out of engagement with cam element 93. Also, as a consequence of the return movement of lever 218, crank 232 is rotated in a clockwise direction forcing lever 138 to rotate until gear 136 is again reengaged in mesh with gear 124. This rotation of crank 232 also moves arm 250 out of engagement with pin 260 and permits cam 252 to return, under the bias of spring 258, to its closed position with respect to opening 22. The return of cap 252 to its closed position also permits the accompanying rotation therewith of bell crank 296 under the bias of spring 306. With the arrival of cap 252 in its closed position, the rotation of the bell crank is arrested by virtue of the continuing engagement of arm 298 with pin 263 and the bell crank is in a position of arrest wherein notch 304 is adjacent but not in engagement with tab 292.

In order to cock or set the mechanism, extremity 270 of cocking lever 264 is grasped by an operator and rotated in a counterclockwise directon, as viewed in FIG. 6. The rotation of the cocking lever is transmitted through link 274 to simultaneously rotate member 288 and trip lever 278, thereby moving blade 294 out of covering relation to the photocell (and rendering the latter operative) and rotating posts 174 and 30. The counterclockwise rotation of member 288 causes tab 292 to engage a portion of arm 300, rotating bell crank 296 until tab 292 slips into releasable engagement with notch portion 304 of arm 300 and restrains the hoisting means from movement in an opposite direction until notch portion 304 is disengaged from tab 292, as hereinbefore described. The rotation of post 30 picks up blades 26 and 28, moving them respectively to set position. The simultaneous rotation of post 174 moves rotatable arm 98 against the bias of spring 176, compressing bellows 94 and rotating timing element 172 so that a side of limb 180 engages pin 198. The engagement of pin 198 with limb 180 arrests the rotation of the timing element, camming the latter into a retrograde movement against its resilient mounting upon arm 98 until stud 198 slips past the radial extremity of limb 180 and, accompanied by stud 200, onto cam surface 184 for engagement therewith. It will therefore be seen that the spring coupling provided by spring 186 between arm 98 and the timing element constitutes means for permitting variation of the angular relation between the arm and timing element during engagement of pin 198 with a side of limb 180.

As trip lever 278 is rotated in a counterclockwise direction, as viewed in FIG. 6, engagement portion 312 disengages upstanding portion 310 of lever 308 thereby permitting latching device 194 to rotate in a clockwise direction (as viewed in FIG. 5) into engagement with pin 190 at a position intermediate flange 206 and notch 212. As arm 98 is rotated with the rotation of post 174, pin 190 is carried in sliding engagement with latching device 194 along the margin of the latching device, exerting a force thereagainst which rotates latch member 204 with respect to element 202 against the compliant mounting provided by spring 208, thereby allowing pin 190 to slide along the margin of latch member 204 until engagement with notch 214. The latter engagement acts to releasably retain arm 98 in its first position and, therefore, releasably retains the shutter in its set position.

The present invention also includes means for providing "bulb" exposures, and in the embodiment shown, comprises elongated bulb lever 314 which is so mounted upon surface 36 intermediate its extremities that a portion thereof extends outwardly of the periphery of plate 20 so as to be manually engageable by an operator of the device. The opposite extremity of bulb lever 314 includes an engageable portion 316 which is rotatable into engagement with a portion of end 309 of lever 308 for rotating the latter a predetermined distance about post 196 against the bias of spring 208. Bulb lever 314 is rotatable between an inoperative position wherein engagement portion 316 is out of engagement with end 309 and an operative position wherein engagement portion 316 has engaged end 309 and rotated lever 308 the requisite amount.

When bulb lever 314 is in its operative position (as in FIG. 8), the distance which post 196 is rotated moves latching device 194 to a new position which narrows the magnitude of movement of device 194 in a counterclockwise direction. Hence, upon actuation of the shutter, the motion of latching device 194 is sufficient to break the engagement of notch 214 with pin 190, but, being then arrested at the new position, cannot move enough to rotate notch 212 out of the path of movement of pin 190, thus the pin is engaged by notch 212. Consequently, rotatable arm 98 moves only sufficiently to release stud 200. This permits blade 26 to move from its closed position toward its open position. However, stud 198, remaining in contact with cam surface 184 because of the engagement of pin 190 with notch 212, retains shutter blade 28 in its open position, the position of the two blades then being as shown in FIG. 3. It will be seen that the shutter blades under these circumstances provide no cover for aperture 22. And, as long as an operator of the device maintains pressure against actuating lever 218, cap 252 is held to one side of aperture 22 and the diaphragm blades are maintained in their open position. Thus the total exposure time is controlled at the discretion of the operator.

After "bulb" exposure has been effected, the return by the operator of bulb lever 314 to its inoperative position permits the operator to reset the mechanism by manipulation of cocking lever 264 so as to effect "instantaneous" exposures thereafter. Means, such as spring 318 connected to an intermediate portion of bulb lever 314 and to plate 20, are provided for biasing the bulb lever into operative or inoperative position, thereby insuring that the bulb lever will not inadvertently be placed in an intermediate position.

The present invention also includes means for synchronizing the operation of the shutter with well-known photographic flash devices for providing supplementary exposure illumination.

In the preferred embodiment, particularly as shown, for instance, in FIG. 2, the means for synchonizing the operation of the shutter comprises a pair of switching devices, one for use with the so-called vaporizable type of flash unit, such as is shown in U.S. Patent No. 2,812,420, issued November 5, 1957 to H. A. Bing et al., and the other for use with the well-known stroboscopic flash unit, such as shown in U.S. Patent No. 2,824,953, issued February 27, 1956 to K. C. Rock, neither the units nor the external circuitry thereof being shown to avoid unduly complicating the drawing.

One switching device for use with a stroboscopic flash unit comprises a connecting or contact means such as resilient contact 320 adapted to be engageable by one contact of the usual stroboscopic unit jack (not shown), contact 320 being mounted upon plate 20 and electrically insulated therefrom. Contact 320 is electrically connected by lead 322 to first switch contact 324. The latter is mounted upon plate 20 so as to be electrically insulated therefrom and comprises a resilient, electrically conductive element disposed in the path of rotation of a portion of arm 40 of blade 28. Arm 40 is preferably formed of an electrically conductive substance grounded to plate 20 as through post 30 and, therefore, constitutes a switch contact. As known in the art, the other contact of the jack of the stroboscopic flash unit also is grounded to plate 20. Switch contact 324 and arm 40 are so disposed relative to one another as to be out of engagement whenever blade 28 is in covering position relative to aperture 22. When blade 28, upon rotation thereof, arrives at its uncovering position with respect to aperture 22, arm 40 engages switch contact 324 thereby actuating the stroboscopic flash unit. Because switch contact 324 is in the path of rotation of arm 40, it is also in the path of rotation of arm 34 of blade 26 and is normally out of engagement with arm 34 whenever blade 26 is in uncovering position relative to the exposure aperture. Blade 26 includes thereon an engagement element 326 adapted to engage contact 324 as blade 26 moves to covering position, thereby moving contact 324 out of engagement with arm 40. Engagement element 326 is electrically insulated from blade 26. It will therefore be seen that upon actuation of the shutter for exposure, the stroboscopic flash unit is activated immediately as exposure commences, i.e., as soon as blade 28 has uncovered aperture 22. The exposure interval, therefore, obtained by use of the stroboscopic flash unit is determined by the duration of the flash rather than by the timing of the shutter mechanism. Immediately upon termination of exposure, the flash contacts are opened so as to prevent undue drain upon the stroboscopic flash unit.

The other switching device comprises a two element switch including a stationary switch contact, such as pin 328, mounted upon plate 20 and electrically connected thereto. Also included is a movable contact 330 which is mounted upon plate 20 for rotation with respect thereto and is insulated therefrom, contact 330 being rotatable in and out of engagement with pin 328. Resilient means such as spring 332 are provided for biasing contact 330 toward engagement with pin 328. A portion of contact 330 is also located in the path of movement of pin 333 which is disposed upon arm 179, pin 333 being formed of an electrically insulating material so that no electrical connection is formed by its engagement with contact 330. The parts thus far described are so disposed that when rotatable arm 98 is in its first position and the shutter mechanism is, therefore, in set position, contact 330 and 328 are retained out of engagement with one another through the engagement of pin 333 with contact 330. Following actuation of the shutter mechanism, stud 200 is released from cam surface 184 to initiate exposure, and the rotation of arm 98 by which this is accomplished rotates arm 179, allowing contact 330 to move toward pin 328 under the bias of spring 332. At a predetermined rotation before the timing element has rotated sufficiently to disengage stud 198 from cam surface 184, arm 179 has rotated sufficiently to allow the switch contacts to close and thus actuate the usual vaporizable type of flash unit. The flash synchronization provided by this switch device is a function of the shutter timing because continued rotation of the timing element following the switch closure releases stud 198 and allows the termination of exposure by the closure of blade 28.

Safety means are provided in connection with the latter switching device in order to maintain an open circuit except during shutter actuation, thereby preventing premature discharge through the flash bulb filament. To this end, the shutter is provided with lead 334 electrically connected to contact 330 and to one side, such as first switch element 336, of a supplementary switch shown, for instance, in FIG. 7. First switch element 336 comprises a stationary post maintained upon surface 36 of plate 20 and electrically insulated therefrom. Also mounted on plate 20 adjacent first switch element 336 and electrically insulated from both the latter and plate 20, is a resilient switch element 338. Element 338 is so disposed in the path of movement of finger 224 of actuating lever 218 as to be engageable by an insulating portion or boss 340 mounted adjacent the extremity of finger 224. Elements 338 and 336 are so disposed as to be retained out of engagement with one another by boss 340 whenever actuating lever 218 is in its rest position, element 338 being free to move into contact with element 336 through the resiliency of the former only when boss 340 is moved consequent to rotation of actuating lever 218 out of its rest position. The resilient switch element 338 is connected by means such as lead 342 to one side of the standard vaporizable flash unit, the other side of the flash unit bein, of course, grounded to plate 20 and, therefore, electrically coupled to pin 328. It will therefore be seen that no power can flow through the flash unit until first, switch elements 338 and 336 are allowed to contact one another upon rotation of the actuating lever, and then after rotatable contact 330 has moved into engagement with pin 333.

It has heretofore been noted that the invention comprises compensating means for adjusting the response of the shutter for variables such as different film speeds. The compensating means act to rotate the entire galvanometer as a unit so that the position of the zero point (the "no-current" position of the galvanometer needle) is variable with respect to both the fixed position of valve aperture 107 and the fixed path of movement of pin 92 thereby comprising means for varying the relation or coupling of the galvanometer with the exposure interval control means and with the aperture control means. The compensating means also comprises means for adapting the shutter mechanism for manual operation. Thus, the invention includes a selected indicating mechanism which, in the form shown particularly in FIGS. 9, 10 and 11, comprises indicating element or circular disc 344 which is mounted for rotation about pivot 346 which extends through elongated support member 348. The support member is mounted adjacent surface 36 near galvanometer 118 upon posts 350 and 352. Connected to pivot 346 for rotation therewith and with disc 344 is gear 354 which is in meshing engagement with gear 124. Thus rotation of the latter is transmitted through gear 354 and pivot 346 so as to be accompanied by a corresponding rotation of disc 344.

Disc 344 includes thereon a pair of sets of indicia (numerals 355 and 356 being employed to identify exemplary members of each set), the elements of one set being arranged in circular order about the pivotal center of the disc, and the elements of the other set being similarly arranged in another circle concentric with the first. One set 356 of indicia comprises a series or arbitrary set of numerals, well known in the art, indicative of exposure values, i.e., so-called EV numbers. The other set 355 of indicia comprises a plurality of arbitrary numerals, also well known in the art, indicative of ASA film speeds. The indicia of each set are arranged in a predetermined manner with respect to one another so that some indicia of each set lie upon substantially the same radii with respect to the pivotal center of the disc.

Figure 10:
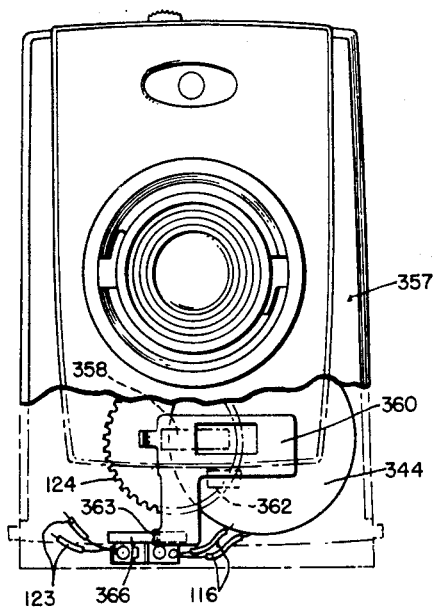
FIG. 10 is a diagrammatic, rear elevational view of part of a shutter housing adapted to enclose the embodiment of the invention as shown in FIG. 6 and having elements cooperating therewith.
Figure 11:
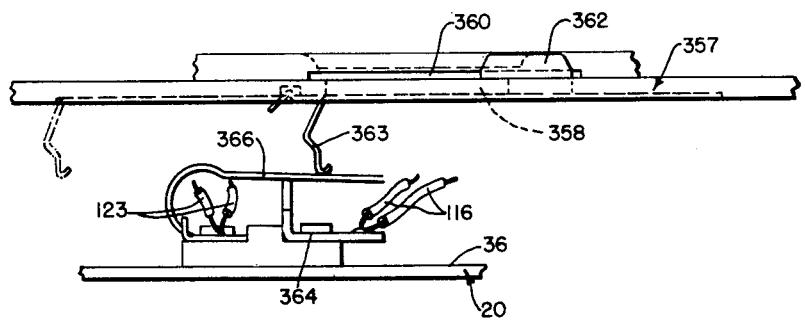
FIG. 11 is an end view partly in fragment of the embodiment of FIG. 10.

Referring particularly to FIGS. 10 and 11, there will be seen, partly in fragment, a covering element or front housing 357 adapted to enclose the shutter mechanism adjacent surface 36 thereof. The housing includes an opening or elongated window 358 so located as to overlie a radial portion of disc 344 when housing 357 is in covering relation to the shutter mechanism. Window 358 is provided with a slide mechanism which includes planar cover 360 mounted for movement in its own plane across the window and dimensioned to cover substantially one half thereof. Manually engageable means, such as button 362, is connected with the slide mechanism to comprise means by which cover 360 can be moved to block either one end portion or the other of the window by manual operation of the operator of the mechanism. The slide mechanism also includes an upstanding member, such as tab 363, which extends substantially perpendicular to the plane of movement of the slide mechanism and, being firmly attached thereto, is movable with cover 360.

It should be noted that leads 116 and 123 to galvanometer 118 are connected to the latter through the terminals of a switching device which comprises a first or stationary contact 364 mounted upon surface 36 of plate 20 and electrically insulated therefrom. The switching device also includes a movable member, such as resilient contact 366, which is also mounted upon surface 36 and electrically insulated therefrom. Contact 364 is connected to lead 116 and contact 366, in turn, is connected to lead 123. Contact 366 is normally biased as by its own resiliency out of engagement with contact 364 and is movable into engagement with the latter to provide an electric network which effectively short circuits the galvanometer, therefore, rendering the latter inoperative.

When housing 357 is in covering relation to the shutter mechanism, resilient contact 366 is so disposed as to extend into a portion of the path of movement of tab 363. When the tab is in a first position wherein cover 360 blocks one end of window 358, tab 363 is out of engagement with contact 366; and when the tab is moved to a second position wherein cover 360 blocks the opposite end of the window, tab 363 has been moved into engagement with contact 366 thereby moving the latter into engagement with contact 364 and short circuiting the galvanometer. It will therefore be seen that the tab and switching device comprising contacts 364 and 366 constitutes means for selectively rendering the shutter mechanism of the invention either manually or photoelectrically operative insofar as the determination of exposure values is concerned. Consequently, when the tab is in first position and contacts 364 and 366 are open, the exposure values of the shutter mechanism are determinable photoelectrically; the particular indicium disposed upon disc 344 and apparent through the unblocked portion of window 358 therefore is representative of film speed, and the galvanometer is correspondingly adjustable by rotation thereof upon manipulation of element 126 to adjust the mechanism for the "speed" of the photosensitive material to be employed with the shutter. Correspondingly, when the tab is in its second position, the exposure values of the shutter mechanism can no longer be established photoelectrically; and the particular indicium on disc 344 apparent through the unblocked portion of the window indicates the exposure value which is then set according to the desires of the operator by his manipulation of element 126 to rotate the galvanometer.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A photographic exposure control mechanism comprising, in combination, photoelectric means for producing signals in accordance with the intensity of radiation incident thereon, shutter means movable under a bias from a set position to a rest position for effecting exposures the nature of which is determined respectively to said signals, covering means movable between a covering position, wherein said cover means blocks radiation from impinging upon said photoelectric means, and an uncovering position, wherein said cover means is so disposed with relation to said photoelectric means that radiation may impinge upon said photoelectric means, and cocking means comprising a manually movable lever operably connected to both said shutter means and said cover means, whereby movement of said lever causes simultaneous movement of said shutter means and said cover means, said cover means being in said covering position when said shutter means is in said rest position and said cover means being in said uncovering position when said shutter means is in said set position.

2. A photographic exposure control mechanism comprising, in combination, a light-sensitive cell for producing electric signals in accordance with the intensity of radiation incident thereon, shutter means movable from a set position to a rest position relative to an exposure aperture for effecting exposures determined respectively to said signals, biasing means for urging said shutter means toward said rest position, cover means movable with respect to said cell between a covering position, wherein said cover means prevents radiation from impinging upon said cell, and an uncovering position, wherein said cover means is so disposed that radiation may impinge upon said cell, a member separably connected to both said shutter means and said cover means and manually movable to effect simultaneous movement of said shutter means to said set position and said cover means to said uncovering position against the action of said biasing means, holding means for releasably retaining said shutter means in said set position and said cover means in said uncovering position, and an actuating means for releasing said holding means whereby said biasing means causes simultaneous movement of said shutter means to said rest position and said cover means to said covering position.

3. The invention according to claim 2 wherein said cover means comprises a radiation opaque blade mounted for pivotal movement between said covering and uncovering positions.

4. A photographic exposure control mechanism comprising, in combination, a light-sensitive cell for producing electric signals in accordance with the intensity of radiation incident thereon, shutter means movable between set and rest positions for effecting exposures the nature of which is determined respectively to said signals, cover means for rendering said cell operative and inoperative, cocking means comprising a mechanical linkage, manual movement of which causes simultaneous movement of said shutter means to said set position and relative movement of said cover means and said cell to a position wherein radiation may impinge upon said cell, biasing means causing simultaneous movement of said shutter means to said rest position and relative movement of said cover means and said cell to a position wherein said cover means prevents radiation from impinging upon said cell.

References Cited in the file of this patent

UNITED STATES PATENTS

| | | |
|---|---|---|
| 2,373,391 | Green | Apr. 10, 1945 |
| 2,918,854 | Malek | Dec. 29, 1959 |
| 2,935,921 | Rentschler | May 10, 1960 |
| 2,949,069 | Gebele | Aug. 16, 1960 |